United States Patent [19]

Yousuf et al.

[11] Patent Number: 5,229,460
[45] Date of Patent: Jul. 20, 1993

[54] FLUOROPOLYMER-BASED POWDER COATINGS

[75] Inventors: Mohammed K. Yousuf, Trussville, Ala.; Peter J. Stephenson, Wellesbourne, England; Nicholas J. Welton, Stoke-on-Trent, England; Adrian J. Shortland, Kings Norton, England

[73] Assignee: Evodex Powder Coatings, Birmingham, Ala.

[21] Appl. No.: 802,782

[22] Filed: Dec. 6, 1991

[51] Int. Cl.$^5$ .................. C08J 3/12; C08L 27/08; C08L 33/04
[52] U.S. Cl. .................. 525/198; 525/199; 525/197; 524/904; 428/422
[58] Field of Search ............ 525/198, 199; 524/904; 428/422

[56] References Cited

U.S. PATENT DOCUMENTS

| | | | |
|---|---|---|---|
| 3,324,069 | 6/1967 | Koblits | 260/31.4 |
| 3,459,834 | 8/1969 | Schmitt | 525/199 |
| 3,734,415 | 5/1973 | Franz et al. | 241/65 |
| 3,769,371 | 10/1973 | Nersasian et al. | 525/199 |
| 3,944,689 | 3/1976 | Luckock | 427/385 |
| 4,179,542 | 12/1979 | Christofas | 428/324 |
| 4,400,487 | 8/1983 | Stoneberg et al. | 525/199 |
| 4,770,939 | 9/1988 | Sietses et al. | 428/402 |
| 5,030,394 | 7/1991 | Sietses et al. | 523/307 |

FOREIGN PATENT DOCUMENTS

| | | |
|---|---|---|
| 0456018A1 | 11/1991 | European Pat. Off. |
| 57-180668 | 11/1982 | Japan ............... 524/904 |
| 2194539A | 5/1988 | United Kingdom |
| WO90/06345A1 | 6/1990 | World Int. Prop. O. |

OTHER PUBLICATIONS

Smarsh "Powder Coating: Why-How-When" Journal of Paint Technology—vol. 44 No. 565—Feb. 1972.
Peggy Cebe et al., "Effect of Composition on Fracture Properties of PVF$_2$/PMMA Blends".
D. R. Paul, "Properties of Compatible Blends of Poly(vinylidene fluoride) and Poly/(methylmethacrylate)".
Yutaka Ando et al., "Phase Separation in Quenched Noncrystalline Poly(vinylidene fluoride)/Poly(methylmethacrylate) Blends".
T. Nishi et al., "Melting Point Depression and Kinetic Effects of Cooling on Crystallization in Poly(vinylidene fluoride)-Poly(methyl methacrylate) Mixtures", Macromolecules, vol. 8, No. 6, Nov.-Dec. 1975, pp. 909-915.
C. Leonard et al., "Crystallization of Poly(vinylidene fluoride)-Poly(methyl methacrylate) Blends", Macromolecules, vol. 21, No. 10, 1988, pp. 2988-2994, American Chemical Society.
KYNAR, a brochure published by Atochem North America, Inc.
KYNAR 500, a brochure published by Pennwalt Corporation.
FORAFLON, a brochure published by Atochem, which is in the group of Elf Aquitaine of France.
Iragnox 1010, a brochure published 1985 by Ciba-Geigy.

*Primary Examiner*—Carman J. Seccuro, Jr.
*Attorney, Agent, or Firm*—Pennie & Edmonds

[57] ABSTRACT

A solventless process for preparing a fluoropolymer based coating which involves mixing and heating a fluoropolymer with a thermoplastic acrylic resin to obtain a molten mixture, slowly cooling the molten mixture to obtain a solid mass having a degree of crystallinity of at least 85% and grinding the solid mass at a temperature higher than −50° C.

31 Claims, No Drawings

FLUOROPOLYMER-BASED POWDER COATINGS

FIELD OF THE INVENTION

The present invention relates to a process for preparing fluoropolymer based powders and compositions thereof, suitable for use as powder coatings. The invention also relates to a process for coating a substrate with the fluoropolymer based powder composition and the resulting coated substrate.

BACKGROUND OF THE INVENTION

Fluoropolymer based coatings have been used extensively as protective and decorative coatings because of their known stability and durability under adverse or prolonged weathering and chemical exposures.

Solvent based fluoropolymer coatings are well known in the art. They are prepared by dispersing the fluoropolymer in a suitable solvent, applying the dispersion onto a substrate and subjecting the coated substrate to heat. The solvent used is generally an organic solvent which does not interact with the fluoropolymer at ambient temperatures, but exhibits solvent activity at higher temperatures. Organic solvents are health hazards and environmentally damaging compounds and the recovery of these solvents is a costly and time-consuming procedure. Therefore, a need has arisen in the industry for cost-effective processes for preparing fluoropolymer based powders which produce coating films with flow and levelling characteristics comparable to those exhibited by solvent based dispersions.

Solventless processes for preparing pigmented poly(vinylidene fluoride) based coatings are known in the art. For example, British Patent Specification No. 2,194,539 A, U.S. Pat. Nos. 4,770,939 and 5,030,394 disclose a mixture of poly(vinylidene fluoride) resin and a thermoplastic acrylic resin, such as poly(methylmethacrylate), which is extruded and pelletized. To obtain proper dispersion of the ingredients, the dry mixture must be extruded at about 220° C. and the resultant hot extrudate must be rapidly chilled or quenched with cooling water before it may be pelletized. This rapid cooling process results in particulates which are highly amorphous in form. After pelletization, the resulting pellets are pre-cooled to a temperature of about −150° C. and ground cryogenically in a hammer mill. Cryogenic grinding is defined in the specification of both patents as grinding at a temperature no higher than −50° C. The extremely low grinding temperatures are accomplished by the introduction of substantial amounts of liquid nitrogen. Particles which are larger than a predetermined size are then sieved out.

The principal disadvantage of the process disclosed in British Patent Specification No. 2,194,539 A, U.S. Pat. Nos. 4,770,939 and 5,030,394 is that a large amount of liquid nitrogen is needed to cool and embrittle the amorphous pellets prior to grinding and to simultaneously maintain the hammer mill at a grinding temperature of less than −50° C. Such cryogenic grinding procedure using a large amount of liquid nitrogen is expensive and limited in its application in that only specially designed grinding mills which can withstand continuous operation under the extremely low cryogenic temperatures can be used. The particles that result from this process is relatively coarse in size distribution and produce coating films with inferior flow and levelling characteristics.

The compositions and the process for preparing powder coatings as described in this invention yield fluoropolymer based powder coatings with unusually good flow and levelling characteristics with films comparable to those obtained from solvent-based fluoropolymer coatings.

SUMMARY OF THE INVENTION

The present invention relates to an improved process for preparing fluoropolymer based powders which comprises mixing a thermoplastic fluoropolymer with another thermoplastic polymer that is compatible with it in the melt. A low melting point fluorinated terpolymer or an antioxidant may also be added. The resulting solid mass is cooled in such manner as to obtain a highly crystalline form and then is ground in any one of a number of mills into particle form. The invention also relates to the resulting powder coating product itself.

The present invention further provides a process for coating a substrate with the fluoropolymer based powder mixture and applying that to such substrate, as well as the resulting coated substrate itself.

DETAILED DESCRIPTION OF THE INVENTION

The fluoropolymer used in the present invention is preferably a fluorohydrocarbon polymer, such as poly(vinylidene fluoride) or a copolymer with at least 80% by weight of vinylidene fluoride and up to 20% by weight of at least one other fluorine-based monomer. Suitable fluorinated monomers which may be used with vinylidene fluoride are tetrafluoroethylene, hexafluoropropylene and vinylfluoride, having the characteristics listed in U.S. Pat. Nos. 4,770,939 and 5,030,394. The fluoropolymer is most preferably poly(vinylidene fluoride) and is commercially available from Atochem North America, Inc. under the trade designation KYNAR 500 PC®, KYNAR 710® or KYNAR 711®.

The fluoropolymer may be mixed with another thermoplastic polymer. The preferred thermoplastic polymers are acrylic polymers with units derived from acrylates or methacrylates, such as copolymers derived from an alkyl methacrylate, preferably, methyl methacrylate or from at least one other olefinically unsaturated monomer. Acrylic acid and methacrylic acid are also suitable as the other olefinically unsaturated monomer. Advantageously, the copolymers comprise at least 75% by weight of units derivable from an alkyl methacrylate and up to 25% by weight of units derivable from one or more other olefinically unsaturated monomers. The thermoplastic polymer is preferably poly(methyl methacrylate) or an alkyl methacrylate/alkyl acrylate copolymer. These thermoplastic polymers have the characteristics listed in U.S. Pat. Nos. 4,770,939 and 5,030,394 and is commercially available from Rohm & Haas Company under the trade designation Acryloid B-44®.

The weight ratio of the fluoropolymer to the thermoplastic acrylic polymer is in the range of from about 80:20 to 40:60, preferably from about 75:25 to 65:35. It is an advantage of the present invention that decreasing the fluoropolymer does not make grinding any more difficult; grinding may in fact be easier. On the contrary, U.S. Pat. Nos. 4,770,939 and 5,030,394 indicates that compositions containing lower amounts of poly(vinylidene fluoride) have to be ground at even lower temperatures because they are more difficult to grind.

A low melting point fluorine-based terpolymer may also be added to the fluoropolymer/thermoplastic acrylic polymer mixture. A terpolymer is a polymer made from three monomers. Such a low melting point terpolymer would have, for example, a melting point of not higher than 150° C. A suitable terpolymer is vinylidene fluoride-tetrafluoroethylene-hexafluoropropylene, having a melting temperature of about 87° to 93° C. and a melt viscosity of about 11,000 to 13,000 Poise at 125° C. The preferred terpolymer is commercially available from Atochem, North America, Inc. under the trade designation KYNAR ADS ®. The weight ratio of the fluoropolymer to the terpolymer is in the range of from about 50:50 to 99:1, preferably about 90:10.

The mixture may also contain other additives, such as corrosion inhibiting pigments, dry flow promoting agents, antioxidants, adhesion promoters and ultra-violet-absorbing materials, although not required.

The mixture preferably contains at least one pigment. The amount of pigment used varies with the choice of pigment. For example, for a white coating which comprises titanium dioxide ($TiO_2$), 20 to 40% by weight of titanium dioxide, based on the mass of the mixture, including the titanium dioxide, may be required.

The mixture may also contain at least one flow-promoting agent. Flow-promoting agents are well known in the art and are typically acrylic polymers of very low molecular weight. We have surprisingly found, that when the low melting point fluorinated terpolymer is added to the fluoropolymer mixture, a powder coating material having extremely good flow characteristics results even without the addition of an acrylic based flow-promoting agent. Thus, a flow-promoting agent is not essential to the present invention.

The mixture may further contain a minor amount of an antioxidant, such as 2,2-bis[3-[3,5-bis(1,1-dimethylethyl)-4-hydroxyphenyl]-1-oxopropoxy]methyl]-1,3-propanediyl 3,5-bis(1,1-dimethylethyl)-4-hydroxybenzenepropanoate, having a molecular weight of about 1178 and a melting temperature of about 110° C. The preferred antioxidant is commercially available from Ciba-Geigy under the trade designation Irganox 1010 ® and is covered by U.S. Pat. Nos. 3,285,855 and 3,644,482. The addition of Irganox 1010 ® enhances heat stability and provides protection against thermal degradation and discoloration of the coating film due to excessive heat curing temperatures.

The fluoropolymer and the thermoplastic polymer are blended, preferably in the melt, a suitable blending temperature for mixtures of poly(vinylidene fluoride) and poly(methyl methacrylate) being in the range of from 190° to 240° C. Other additives, for example, pigment, required in the final powder may be incorporated into the mixture before or during melt-blending, or, in some cases (for example, in the case of a solid flow aid), may be incorporated during grinding. Blending may be carried out, for example, in an extruder, normally after premixing of the components of the blend.

A particulate solid mass is obtained from the molten mixture of the fluoropolymer and the thermoplastic polymer. We have surprisingly found that the need for grinding of the particulate solid mass at temperatures below −50° C. can be avoided, while obtaining a satisfactory product, when the fluoropolymer in the particulate solid mass is in a highly crystalline form, and advantageously has a degree of crystallinity (as hereinafter defined) of at least 85%, advantageously at least 90%, and preferably at least 95%.

For the purposes of this specification, the degree of crystallinity of the fluoropolymer in the particulate solid mass to be fed to the grinding step is arrived at by comparing the heat of fusion ($\Delta H_f$) of a sample of the particulate solid mass (including any additives, for example, pigments and flow improvers) with the heat of fusion of a sample of the pure fluoropolymer which has been brought to its crystalline melting temperature and has been cooled, or allowed to cool, to 20° C. (in still air at 20° C.) in the form of a block having dimensions 170 mm × 73 mm × 25 mm, and adjusting the resulting value to allow for the proportion of the fluoropolymer in the particulate solid mass. The heat of fusion in each case is measured by Differential Scanning calorimetry (DSC), using a heating rate of 10° C./min.

Thus the degree of crystallinity of the fluoropolymer in the particulate solid mass is defined herein as:

$$\frac{\Delta H_f \text{(particulate solid mass)}}{\Delta H_f \text{(pure fluoropolymer remelted and cooled under the conditions defined above)}} \times \frac{100}{\text{proportion by mass of that fluoropolymer in the particulate solid mass}}$$

If the particulate solid mass contains more than one fluoropolymer, the fluoropolymer to be used in the pure form as the reference for the purposes of the above definition is the fluoropolymer present in the greater, or greatest, proportion by mass, and the proportion of that fluoropolymer should be used in the above calculation. If the DSC trace for the sample of the particulate solid mass has more than one melting peak (indicating the presence in the particulate solid mass of crystallite constituents of significantly different melting points) the heat of fusion is calculated, for the purposes of the above definition, using the melting peak corresponding to the melting range closest to that of the pure fluoropolymer used as the reference.

A solid mass in which the fluoropolymer is in a highly crystalline form is advantageously obtained from the molten mixture by ensuring that cooling of the mixture to ambient temperature from the temperature at which crystallization of the fluoropolymer commences takes place relatively slowly (as compared with the rapid cooling obtained by quenching). Advantageously, the molten mixture is allowed to cool in substantially still air at ambient temperature. Accordingly, the invention also provides a process for preparing a fluoropolymer-containing powder, which comprises obtaining a molten mixture of a fluoropolymer and at least one thermoplastic polymer which, in the proportions used, is compatible with the fluoropolymer in the melt, obtaining a particulate solid mass from the molten mixture by a process which includes the step of causing or allowing the molten mixture to cool, preferably to ambient temperature, without quenching, and, if necessary, breaking up the solid material obtained in the cooling step, and grinding the particulate solid mass.

In one preferred embodiment of the invention, the fluoropolymer and the thermoplastic polymer are blended in an extruder (after premixing), and the mixture is extruded to give flat blocks which are then allowed to cool in air at ambient temperature, without the use of forced cooling. The size of the blocks is not critical, and will be dictated largely by handling considerations, although if very large blocks are used an undesirably long time may be required for complete cooling of the blocks. Block sizes of the order of 200 mm × 100 mm×50 mm have been found to be convenient, but blocks significantly larger or smaller than this could be used if desired.

Advantageously, the molten mixture of the fluoropolymer and the thermoplastic polymer is collected in individual vessels or containers of any size and the mixture is then allowed to cool in air at ambient temperature. For example, containers having dimensions of approximately 15 inches×12 inches×3 inches (380 mm×305 mm×75 mm) preferably 8 inches×4 inches×3 inches (205 mm×100 mm×75 mm) may be used. The larger the containers, the larger the cooling time will be.

Other methods by which a solid mass may be obtained from the molten mixture of the fluoropolymer and the thermoplastic polymer include quenching the mixture to give a solid product in, for example, sheet or tape form, and then subjecting the solid product to an annealing or orientation step.

The molten mixture may be quenched by any suitable method, for example, by passing it into a bath of liquid and/or by spraying it with a liquid.

The quenched extrudate may then be annealed, for example, at a temperature of up to 160° C., preferably from 60° to 140° C., most preferably from 100° to 140° C., until the desired degree of crystallinity is obtained.

Orientation of a solid product in, for example, sheet or ribbon form, may be carried out using two rollers, the second of which has a higher peripheral speed than the first.

As indicated earlier, the size of the particles in a particulate solid mass used in accordance with the invention is not critical, provided that the particulate solid mass is suitable for grinding. For convenience, the particulate solid mass will typically be in the form of, for example, granules or pellets, but larger particles may be employed where the form of the grinder permits.

The solid product obtained from the cooling step may in some cases be obtained directly in the form of particles of a suitable size for feeding to the grinder. In this case, no further breaking up of the particles is required before grinding. Normally, however, breaking up of the cooled solid mass will be necessary in order to produce the particulate solid mass to be fed to the grinder. Such breaking up may be effected by any suitable means, for example, by crushing and/or shearing.

The term "grinding" used in this specification includes all size-reduction processes suitable for producing a powder from a particulate solid mass, and is not restricted to, for example, processes in which material is treated by opposed surfaces Grinding may be effected by any suitable means.

In a preferred embodiment of the invention, the particulate solid mass is ground in a pin disc mill, also known as a stud mill or needle mill. The material used in the above-mentioned British and U.S. specifications did not give a satisfactory product when ground using a needle mill, even when cryogenic grinding was used (see Comparative Example B).

In a further embodiment, the particulate solid mass is ground in a hammer mill.

In a further embodiment, which is not at present preferred, the particulate solid mass is ground in a jet mill in which size reduction is effected by the high-speed collision of particles in a fluidised bed.

In accordance with the invention, grinding of the particulate solid mass at the very low temperatures required in the above-mentioned British and U.S. specifications is not necessary, as the particulate solid mass is inherently sufficiently brittle to make it possible to obtain a satisfactory product by grinding at higher temperatures. Thus, grinding may, if desired, be carried out in a mill that is not specially designed to be used at very low temperatures. Some cooling of the mill, e.g., by the circulation of cooled air or water, or by the use of a trickle of a small amount of liquid nitrogen, may be desirable to remove the heat which is inevitably generated during grinding, but the use of the very large amounts of liquid nitrogen required for cryogenic grinding is unnecessary. The particulate solid mass obtained in accordance with the invention can of course be subjected to grinding at very low temperatures if desired, but in general grinding at very low temperatures is avoided when it is possible to do so.

Grinding temperatures are advantageously higher than −50° C., preferably not lower than −35° C., and most preferably not lower than −20° C. In some cases it may be desirable that the grinding temperature should not be higher than 0° C. The air temperature at the outlet of the mill advantageously does not exceed +50° C., and is preferably in the range of from 0° C. to +50° C.

The present invention more especially provides a process for preparing a fluoropolymer-containing powder suitable for use in a powder coating process which comprises obtaining a molten mixture of a fluoropolymer and at least one thermoplastic polymer which, in the proportions used, is compatible with the fluoropolymer in the melt, extruding the mixture, obtaining from the extrudate a particulate solid mass in which the fluoropolymer has a degree of crystallinity (as hereinbefore defined) of at least 85%, advantageously at least 90%, and preferably at least 95%, and grinding the particulate solid mass at a temperature of higher than −50° C., preferably not lower than −35° C., and especially not lower than −20° C. Advantageously, the air temperature at the outlet of the mill is in the range of from 0° to +50° C.

After the grinding step, the resulting powder may, if desired or required, be sieved to remove particles having a particle size greater than a particular value. If, for example, a powder coating product is required, particles having a particle size greater than about 120 μm are preferably removed. The particle size desired will depend on the application, but typically a powder coating product will have a particle size of from 90 to 10 microns, more preferably 65 to 10 microns, especially 40 to 10 microns.

A powder obtained by the process of the present invention may be applied to a substrate using any suitable means, e.g., using electrostatic spray apparatus, a cloud chamber, a fluidised bed, or triboelectric coating apparatus.

The powder may be applied directly onto the substrate. Advantageously however, the powder is applied over one or more intermediate layers. Preferably, a primer, for example, a primer comprising an epoxy resin, is used as an intermediate layer.

After application to the substrate the powder is subjected to a heat treatment to form a coherent coating layer. The heat treatment is preferably carried out at a temperature in the range of from 180° to 260° C., more preferably 200° to 240° C.

We have found that powder coating products obtained in accordance with the invention, in which the fluoropolymer is present in a highly crystalline form, have a sharper melting point and better flow and levelling characteristics than previously proposed poly(vinylidene fluoride) powder coating products such as those obtained in accordance with the teaching of the above-numbered British and U.S. specifications, and the coated substrate has an improved appearance.

The following Examples illustrate the invention.

EXAMPLE 1

A commercially available sample of poly(vinylidene fluoride) resin sold under the trade name KYNAR 710 ® and having a weight average molecular weight of about 84,000 (determined by gel permeation chromatography using dimethylformamide as the solvent and using polyethylene glycol/polyethylene oxide standards), was heated to a temperature of 220° C. and allowed to cool to 20° C. in still air at 20° C. in the form of a block having dimensions 170 mm × 73 mm × 25 mm. The heat of fusion of the material obtained was measured by DSC using a heating rate of 10° C./min and was found to be 60 J/g.

A mixture comprising 63 mass % of the above-identified poly(vinylidene fluoride) resin, 26 mass % of a methyl methacrylate/ethyl acrylate copolymer having a weight average molecular weight of about 51,000 (determined by gel permeation chromatography using dimethylformamide as the solvent and using polyethylene glycol/polyethylene oxide standards), 1% of Resiflow flow enhancing agent and 10% of pigment was melt-blended in a twin screw extruder, after premixing, under the following conditions: 200 rpm; torque 50 to 60%; set temperatures 175° to 200° C. Resiflow is a low molecular weight acrylic polymer, and is a standard flow aid. "Resiflow" is a trade mark. The molten mixture was quenched in a water bath, and the quenched material was pelletised to give pellets approximately 4 mm in length and 2 mm in diameter. The heat of fusion of the quenched material was 28.6 J/g, and the degree of crystallinity of the polyvinylidene fluoride in the pellets, measured by the method described herein, was thus 75.6%.

A sample of the pellets was cryogenically ground in an Alpine 160 UPZ cryogenic mill fitted with a fan beater system. A 0.3 mm screen was used. The temperature of the pellets at the inlet of the mill was −100° C., while the temperature at the outlet was lower than −50° C. The powder obtained was sieved to remove particles having a size greater than 120 μm.

A further sample of the pellets was heated to 200° C. to remelt the polymeric materials, and the molten mixture was extruded to form blocks which were allowed to cool overnight in air at ambient temperature (about 20° C.), and then broken up, using a granulator, to give a particulate solid mass having a particle size of 3 to 10 mm. The particulate solid mass had a heat of fusion of 36.5 J/g, and the fluoropolymer therefore had a degree of crystallinity of 96.6%.

Samples of the slow-cooled particulate solid mass were ground using a pin disc mill. When grinding the first of these samples, liquid nitrogen was trickled through the mill at a slow rate to remove the heat generated during grinding. The flow rate was adjusted so that the air temperature at the outlet of the mill was 15° C. A second sample was ground without the use of liquid nitrogen, and in this case the air temperature at the outlet of the mill was 13°–29° C., the temperature rising as grinding progressed. In each case the powder obtained by grinding was sieved to remove particles larger than 120 μm.

The particle size distribution of the powders was as follows:

| Material | Particle Size Distribution |
| --- | --- |
| Quench-cooled | 100% > 10 μm |
|  | 92% > 32 μm |
|  | 17% > 80 μm |
| Slow-cooled | 98% > 10 μm |
| (Chilled mill | 86% > 32 μm |
| grinding) | 25% > 80 μm |
| Slow-cooled | 98% > 10 μm |
| (No liquid nitrogen | 88% > 32 μm |
| used during grinding) | 22% > 80 μm |

Materials with a particle size distribution broadly comparable to that of quenched-cooled material were thus obtained without the need for cryogenic grinding.

Each of the three powders obtained as described above was electrostatically sprayed onto an untreated aluminum panel and heated to 240° C. for 10 minutes. A continuous film of thickness 60 to 70 μm was obtained in each case. Visual inspection of the coated panels during the heating step indicated that the slow-cooled materials flowed better than the quench-cooled material, and the final films obtained from the slow-cooled materials showed less "orange peel" effect than did the final films from the quench-cooled material.

EXAMPLE 2

A mixture of 308 parts by mass ("p.b.m.") of KYNAR 500 PC ®, 147 p.b.m. of Acryloid B-44 ® (Rohm & Haas), 35 p.b.m. KYNAR ADS ® (Atochem), 1.75 p.b.m. Jet black 1 (Shepherd BK #1), 206.85 p.b.m. TiO₂ R-960 (Du Pont) and 1.4 p.b.m. Irganox 1010 ® (Ciba-Geiqy) was prepared by dry dispersion.

The mixture was then extruded in a Werner and Pfleiderer extruder (Model ZSK-70 Extruder) with the screw rotation set at 313 rpm, the barrel set at 200° C. and the feed zone set at 30° C.

The extrudate was collected in large containers (15 inches × 12 inches × 3 inches—approximately 380 mm × 305 mm × 75 mm and allowed to cool slowly at ambient temperature for 8 hours. The heat of fusion of the material obtained was measured by DSC using a heating rate of 10° C./min and was found to be 24.3 J/g. The degree of crystallinity 92.1%.

The blocks were then broken up into smaller pieces by mechanical attrition or granulation. The granules were ground in an Alpine pin disc mill, using a single-pass and no intermediate sieving screen. The temperature of the granulated pieces prior to introduction into the mill was −100° C. During grinding, the mill was maintained at −35° C. by trickling a small amount of liquid nitrogen into the mill. Using a Malvern laser particle size analyzer, 99% of the resulting powder particles were shown to have a size of less than 90 microns; 88% having a size of less than 74 microns; the average particle size was 37 microns.

The powder obtained from the grinding process was electrostatically sprayed onto a substrate and the coating substrate heated at 246° C. for 10 minutes. The resultant coating, as detected by the naked eye, had extremely good flow and levelling characteristics.

EXAMPLE 3

A mixture of 440 p.b.m. of KYNAR 500 PC®, 210 p.b.m. of Acryloid B-44®, 50 p.b.m. of KYNAR ADS®, 2.5 p.b.m. of Shepherd BK #1, 295.5 p.b.m. of Ti Pure R-960 and 2.0 p.b.m. of Irganox 1010® was prepared by dry dispersion.

The mixture was then extruded in a Werner and Pfleiderer extruder (Model ZSK-30 Extruder), with the screw rotation set at 325 rpm., the barrels set at 200° C. and the feed zone set at 30° C.

The hot extrudate was collected in small containers 8 inches×2 inches×2 inches and placed in an oven set at 100° C. for 48 hours to allow for annealing of the extrudate. The heat of fusion of this annealed material, using the same heating rate as Example 2 was 23.9 J/g. The degree of crystallinity obtained was 91%.

COMPARATIVE EXAMPLE

By way of comparison, the same mixture as Example 3 was prepared by dry dispersion.

The mixture was also extruded in a Werner and Pfleiderer extruder (model ZSK-30 Extruder) with the screw rotation set at 325 r.p.m., the barrels set at 200° C. and the feed zone set at 30° C.

The hot extrudate was quenched in a water bath and the quenched material was pelletized. The heat of fusion of this material using the same heating rate as Example 2 was 17.9 J/g. The degree of crystallinity of the particles in the pellets was 68%.

We claim:

1. A process for preparing thermoplastic polymer based powder, which comprises:
   (a) mixing a poly(vinylidene fluoride) polymer with a compatible acrylic polymer with units derived from acrylates or methacrylates;
   (b) heating the mixture of (a) to obtain a molten mixture;
   (c) slow cooling the molten mixture to ambient temperature, without quenching or subjecting the mixture that is cooled to ambient temperature to a subsequent annealing step, to obtain a solid mass having a degree of crystallinity of at least 85%; and
   (d) grinding the solid mass into particles at a temperature higher than −50° C.

2. The process according to claim 1 wherein the weight ratio of the poly(vinylidene fluoride) polymer to the acrylic polymer is from about 80:20 to 40:60.

3. The process according to claim 1 wherein the weight ratio of the poly(vinylidene fluoride) polymer to the acrylic polymer is from about 75:25 to 65:35.

4. The process according to claim 1 wherein the poly(vinylidene fluoride) polymer is a copolymer with at least 80% by weight of vinylidene fluoride monomer and up to 20% by weight of at least one other fluorine based monomer.

5. The process according to claim 4 wherein the monomer is tetrafluoroethylene.

6. The process according to claim 4 wherein the monomer is hexafluoropropylene.

7. The process according to claim 1 wherein the acrylic polymer is derived from an alkyl methacrylate.

8. The process according to claim 1 wherein the acrylic polymer is derived from methyl methacrylate.

9. The process according to claim 1 wherein the acrylic polymer is derived from acrylic acid.

10. The process according to claim 1 wherein the acrylic polymer is derived from methacrylic acid.

11. The process according to claim 1 wherein a low melting point fluorine-based terpolymer is mixed with the poly(vinylidene fluoride) polymer and the acrylic polymer.

12. The process according to claim 11 wherein the terpolymer is vinylidene fluoride-tetrafluoroethylene-hexafluoropropylene.

13. The process according to claim 11 wherein the terpolymer is at least 4% by weight of the total mixture.

14. The process according to claim 11 wherein the weight ratio of the poly(vinylidene fluoride) polymer to the terpolymer is about 90:10.

15. The process according to claim 11 wherein the weight ratio of the poly(vinylidene fluoride) polymer and terpolymer to the acrylic polymer is from 80:20 to 40:60.

16. The process according to claim 11 wherein the weight ratio of the poly(vinylidene fluoride) polymer and terpolymer to the acrylic polymer is from 75:25 to 65:35.

17. The process according to claim 1 wherein an antioxidant is added to the mixture.

18. The process according to claim 17 wherein the antioxidant is 2,2-bis[3-[3,5-bis(1,1-dimethylethyl)-4-hydroxyphenyl]-1-oxopropoxy]methyl]-1,3-propanediyl 3,5-bis(1,1-dimethylethyl)-4-hydroxybenzenepropanoate.

19. The process according to claim 1 wherein the degree of crystallinity of the solid mass is at least 90%.

20. The process according to claim 1 wherein the degree of crystallinity of the solid mass is at least 95%.

21. The process according to claim 1 wherein the molten mixture is cooled in a container at or above ambient temperature without quenching.

22. The process according to claim 1 wherein the solid mass is ground in a pin disc mill.

23. The process according to claim 1 wherein the solid mass is ground in an air classifying mill.

24. The process according to claim 1 wherein the solid mass is ground in a hammer mill.

25. The process according to claim 23 wherein the grinding is conducted at a temperature from −35° C. to 0° C.

26. A process for preparing a fluoropolymer based powder, which comprises:
   (a) mixing a poly(vinylidene fluoride) polymer with a compatible acrylic polymer with units derived from acrylates or methacrylates with a low melting point fluorine-based terpolymer;
   (b) heating the mixture of (a) to obtain a molten mixture;
   (c) slow cooling the molten mixture to ambient temperature, without quenching or subjecting the mixture that is cooled to ambient temperature to a subsequent annealing step, to obtain a solid mass having a degree of crystallinity of at least 90%; and
   (d) grinding the solid mass at a temperature higher than −50° C.

27. The process according to claim 31 wherein an antioxidant is added to the mixture.

28. The process according to claim 26 wherein the weight ratio of the poly(vinylidene polymer and terpolymer to the acrylic polymer is from about 80:20 to 40:60.

29. The process according to claim 26 wherein the weight ratio of the poly(vinylidene fluoride) polymer and terpolymer to the acrylic polymer is from about 75:25 to 65:35.

30. A process for preparing a fluoropolymer based powder, with comprises:
- (a) mixing poly(vinylidene fluoride), poly(methylmethacrylate), vinylidene fluoride-tetrafluoroethylene-hexafluoropropylene terpolymer, and an antioxidant;
- (b) heating the mixture of (a) to obtain a molten mixture;
- (c) slow cooling the molten mixture to ambient temperature, without quenching or subjecting the mixture that is cooled to ambient temperature to a subsequent annealing step, to obtain a solid mass having a degree of crystallinity of at least 85%; and
- (d) grinding the solid mass at a temperature higher than $-50°$ C.

31. A process for preparing a fluoropolymer based powder, which comprises:
- (a) mixing poly(vinylidene fluoride), poly(methylmethacrylate), vinylidene fluoride-tetrafluoroethylene-hexafluoropropylene terpolymer, and an antioxidant;
- (b) heating the mixture of (a) to obtain a molten mixture;
- (c) annealing the molten mixture at about 100° C. to 140° C. and slow cooling to ambient temperature without quenching or subjecting the mixture that is cooled to ambient temperature to a subsequent annealing step to obtain a solid mass having a degree of crystallinity of at least 85%;
- (d) grinding the solid mass at a temperature higher than $-50°$ C.

* * * * *